United States Patent [19]

Wimmers et al.

[11] Patent Number: 4,903,585
[45] Date of Patent: Feb. 27, 1990

[54] APPARATUS FOR DISPENSING COFFEE HAVING A FOAMED SURFACE

[75] Inventors: James E. Wimmers, Marysville; Thomas B. Winters, Raymond, both of Ohio

[73] Assignee: Nestec, S.A., Vevey, Switzerland

[21] Appl. No.: 312,787

[22] Filed: Feb. 21, 1989

Related U.S. Application Data

[62] Division of Ser. No. 140,365, Jan. 8, 1988, Pat. No. 4,830,869.

[51] Int. Cl.⁴ ............................................. A47J 31/00
[52] U.S. Cl. ..................................... 99/275; 366/162; 99/287
[58] Field of Search ................. 99/275, 279, 284, 287, 99/285, 280, 281, 282, 283, 300, 304, 323.3; 366/160, 161, 162, 165, 144, 145, 149, 134, 16, 19, 22; 426/433

[56] References Cited

U.S. PATENT DOCUMENTS 3,171,344 3/1965 Mathieu ................................ 99/287
4,357,861 11/1982 Silvestro ........................... 99/323.3

Primary Examiner—Robert W. Jenkins

[57] ABSTRACT

Apparatus for producing and dispensing a reconstituted coffee beverage having a thick layer of foamed coffee on its surface, similar in appearance to cappuccino coffee beverage. A measured amount of dehydrated coffee concentrate, such as spray dried instant coffee, and a small amount of cold water are combined, with vigorous agitation in a cooled mixing chamber to form a cold, foamed coffee concentrate. Upon formation of the foamed concentrate, a controlled amount of hot water is introduced into the mixing chamber to dilute the foamed concentrate while substantially retaining the foamed structure to thereby provide a liquid reconstituted coffee fraction of a desired concentration, and a foamed coffee fraction of similar concentration. The resulting beverage is then discharged from the mixing chamber into a cup, with the foamed coffee fraction resting on the surface of the liquid coffee fraction to provide a hot coffee beverage having a thick layer of stable foam on the surface of the beverage. A timer mechanism is provided to sequentially control the introduction of dehydrated coffee, cold water and hot water into the mixing chamber, and the discharge of the reconstituted beverage from the chamber.

10 Claims, 1 Drawing Sheet

APPARATUS FOR DISPENSING COFFEE HAVING A FOAMED SURFACE

This is a divisional of co-pending application Ser. No. 07/140,365 filed Jan. 8, 1988, now U.S. Pat. No. 4,830,869.

BACKGROUND OF THE INVENTION

This invention relates to a method and apparatus for producing and dispensing hot beverages. More particularly the invention relates to a coffee dispenser for producing and dispensing hot coffee having a thick layer of foamed coffee on the surface of the liquid beverage.

A wide variety of coffee dispensers are presently available on the market. Such dispensing machines typically operate by combining a metered volume of hot water with a measured amount of particulate instant coffee in a suitable mixing bowl and dispensing the reconstituted coffee beverage into a cup or other container positioned below the bowl. While such conventional dispensing machines are adequate for preparing and dispensing conventional coffee beverages, they are not suitable for preparing or dispensing cappuccino-type coffee, that is coffee having foam on the surface of the beverage. Cappuccino-type coffee typically has been prepared heretofore by injecting steam into a separate portion of the coffee or into milk to froth that portion of the coffee or milk, with the frothed portion then being poured into a cup which has been partially filled with coffee beverage, with the frothed portion forming a layer of foam on the surface of the liquid beverage.

SUMMARY OF THE INVENTION

The present invention is directed to a method and apparatus for producing and dispensing individual cups of hot cappuccino-type coffee beverage, that is, coffee having a thick layer of coffee foam on the surface of the liquid coffee. In accordance with the present invention, a cold liquid coffee concentrate, formed by dissolving powdered instant coffee in a minor amount of cold water, is formed into a foam by vigorous agitation in a confined mixing chamber, and the foamed coffee concentrate is then diluted by the addition of hot water to provide a liquid coffee beverage of the desired strength while substantially retaining the foam structure. Upon discharge from the mixing chamber the foamed coffee forms a thick layer of stable foam on the surface of the liquid beverage.

The beverage dispensing apparatus of this invention includes a mixing chamber in which powdered instant coffee, from a supply hopper mounted in the apparatus, is reconstituted with vigorous agitation with a minor portion of cold water to form a foamed coffee concentrate, and then with a major portion of hot water to dilute the foamed coffee concentrate and form a liquid beverage of the desired concentration while substantially retaining the foamed structure. A timed agitator is mounted in the chamber for vigorously mixing the powdered coffee with the cold water fractions. A water line supplies cold water to the mixing chamber and maintains the temperature of the mixing chamber within desired limits. The water line also supplies water to a heating unit in the dispenser for the introduction of hot water into the mixing chamber, with the volume of cold water and hot water supplied to the mixing chamber being controlled by valves in the respective lines. A metering unit provided in the supply hopper controls the amount and timing of the instant coffee introduced into the mixing chamber. The agitator in the mixing chamber and the metering unit in the supply hopper are both actuated by a motor mounted in the dispenser. A timing mechanism is provided to control the sequence and timing of the activation of the motor, the cold water supply valve, the heating unit and the hot water supply valve. Suitable discharge means are provided at the bottom of the mixing chamber to discharge the reconstituted liquid coffee and the foamed coffee into a cup or other container, with the foamed coffee forming a thick layer on the surface of the liquid coffee.

In the process of the present invention, the quantity of powdered instant coffee normally used to produce a cup of reconstituted instant coffee, is introduced into the mixing chamber together with a measured volume of cold water, which comprises only a fraction of the amount of water normally used to produce a cup of reconstituted coffee of the desired strength. The coffee powder and cold water are combined with vigorous stirring in the mixing chamber to form a liquid coffee concentrate which is displaced against the sidewalls of the mixing chamber by centrifugal force, with air being entrained in the concentrate to provide a foamed coffee concentrate in the mixing chamber. That is, air bubbles are dispersed throughout a continuous phase of the cold liquid coffee concentrate. A portion of the water supplied to the apparatus is then heated to a desired temperature by passage through a heating unit, and a measured quantity of hot water, which comprises the major portion of the water needed to produce a cup of reconstituted instant coffee of the desired strength, is introduced into the mixing chamber. The addition of the hot water to the foamed concentrate in the mixing chamber dilutes the concentrate to provide a liquid coffee beverage of the desired concentration while substantially retaining the foamed structure in the mixing chamber. The reconstituted liquid coffee and the foamed coffee are discharged from the mixing chamber into a cup or other suitable container, with the coffee foam forming a thick layer of stable foam on the surface of the beverage, similar to a cappuccino beverage.

DETAILED DESCRIPTION

Figure 1:
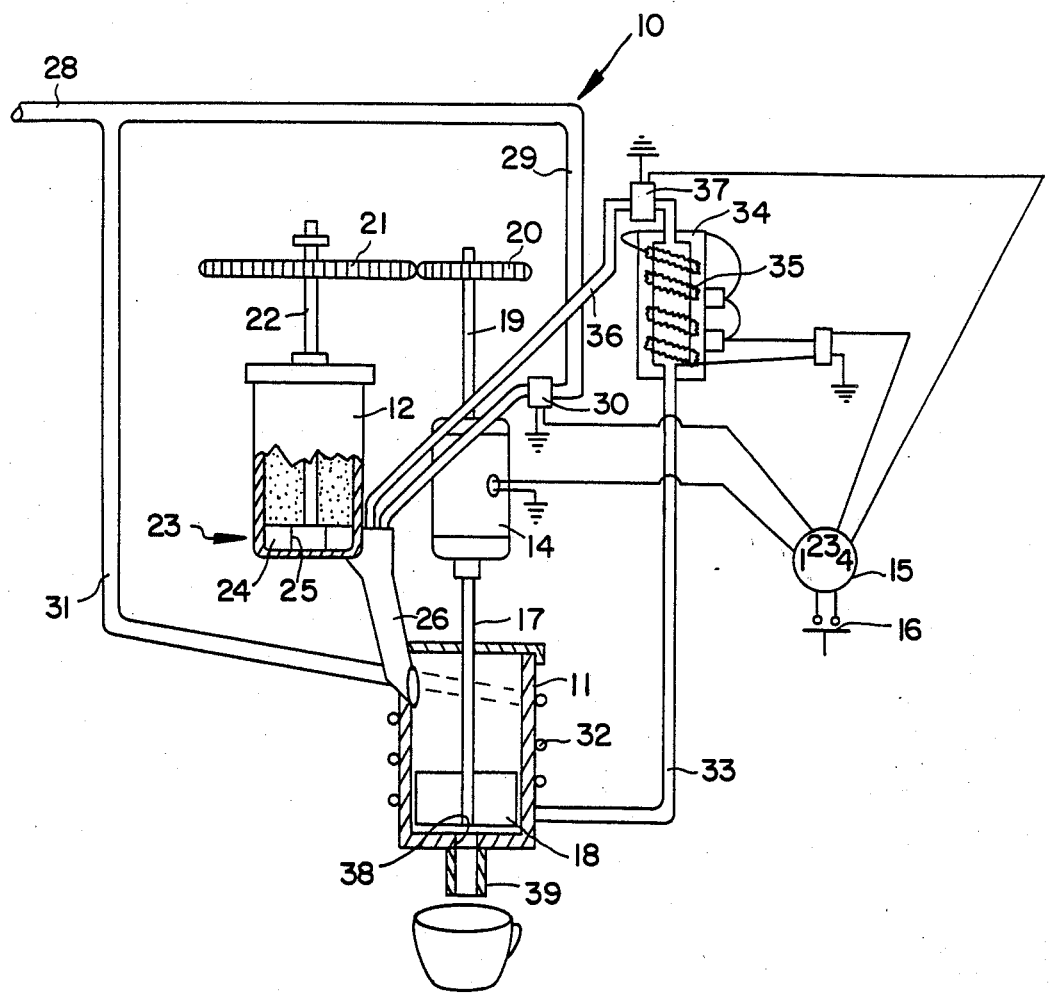
FIG. 1 is a diagrammatic view of the beverage dispensing apparatus of the present invention.

Referring now to the drawing, the beverage dispenser 10 of the present invention includes a mixing chamber 11 into which measured amounts of particulate dehydrated instant coffee, such as spray dried or freeze dried coffee, are discharged from storage hopper 12 for reconstitution with water. A conventional electric motor 14 is mounted above the mixing chamber and is connected with a suitable power supply and with timer 15 which actuates operation of the motor. A manually operable cycling switch 16, such as a push button switch, is provided on the dispenser and is adapted to be operated or closed whenever it is desired to dispense a measured portion of reconstituted coffee. Closing of switch 16 instantaneously energizes the timer 15.

The motor 14 has a vertically downwardly projecting drive shaft 17 which carries a vaned agitator 18 positioned within the mixing chamber, with the agitator being mounted for rotation on shaft 17 in close proximity to the bottom wall of the mixing chamber and adapted to vigorously whip liquid introduced into the mixing chamber. The motor also has a vertically upwardly projecting drive shaft 19 having a gear 20 keyed thereto at the upper end of the shaft. Gear 20 meshes with a second gear 21 supported on shaft 22 which extends vertically downwardly into the supply hopper 12. Rotation of shaft 22 drives a metering unit 23 for discharging a measured amount of powdered instant coffee from the supply hopper into the mixing chamber. The metering unit 23 includes a circular plate 24 which is rotatably mounted on shaft 22 adjacent the bottom wall of the supply hopper, with the plate having a plurality of pockets 25 spaced equidistant around its periphery. Particulate instant coffee in the hopper falls by gravity into the pockets and is carried by rotation of plate 24 to a discharge opening (not shown) in the bottom wall of the supply hopper and passes into duct 26 which extends downwardly from the supply hopper into the mixing chamber. The volumetric space defined by each of the pockets 25 is equivalent to the quantity of powdered instant coffee required to produce one cup of reconstituted coffee of the desired concentration. The transmission ratio of gears 20 and 21 is such that in one activation cycle of the motor 14, plate 24 is rotated to the extent that one of the pockets 25 is rotated above the hopper discharge opening during the cycle. Other suitable metering means, such as a conventional rotary vane metering unit, an auger, and the like, capable of discharging a measured amount of powdered instant coffee from the storage hopper in response to the activation of the motor, may of course be used.

Cold water is supplied to the dispenser 10 through constant pressure water line 28. One branch 29 of line 28 carries cold water to duct 26 for introduction into mixing chamber 11. According to a preferred embodiment, the discharge end of duct 26 is positioned in mixing chamber 11 so that liquid carried by the duct is introduced tangentially into the mixing chamber along the sidewalls of the chamber. Solenoid valve 30 in line 29 regulates the flow of cold water through the line, and is connected with timer 15 to control the timing and quantity of cold water introduced into the mixing chamber. A second branch 31 of line 28 carries cold water to the inlet of cooling coil 32 which surrounds the exterior of the sidewalls of the mixing chamber to cool the mixing chamber. Cold water exiting from cooling coil 32 is carried in line 33 through heating unit 34 in which the water in line 33 is heated to a desired temperature, e.g. 80° C.-90° C.. Water in line 33 is heated in unit 34 by electrical heating elements 35, with the heating elements being connected with timer 15 which controls the timing and duration of the activation of the heating elements. Heating unit 34 is provided with a control thermostat and a safety thermostat, of types which are well known in the art, with the safety thermostat breaking power to the heating elements when it senses a temperature above a predetermined value.

Hot water from heating unit 34 is carried through line 36 to duct 26 for introduction into the mixing chamber, with the flow of water through line 36 being controlled by solenoid valve 37. Solenoid valve 37 in line 36 regulates the flow of hot water through the line, and is connected with timer 15 to control the amount and timing of the hot water introduced into the mixing chamber.

A discharge opening 38 is provided in the bottom of the mixing chamber to discharge reconstituted coffee liquid and foam by gravity from the mixing chamber when agitator 18 stops rotating, with the reconstituted coffee being carried by spout 39 into a cup or other suitable container positioned below the chamber.

Upon closure of switch 16, timer 15 is instantaneously energized. The timer sequentially actuates motor 14, thereby activating agitator 18 in the mixing chamber and metering unit 23 in the supply hopper to discharge a measured amount of instant coffee into duct 26; solenoid valve 30, to dispense a predetermined amount of cold water into the mixing chamber; heating unit 34, to heat water in line 33 to a predetermined temperature; and solenoid valve 37, to dispense a predetermined amount of hot water into the mixing chamber. Timer 15 is a motor containing four switches (1, 2, 3, and 4) which open and close automatically upon closure of switch 16, in the sequence discussed above, at predetermined times during a dispensing cycle. The electrical control circuitry of the timer is well known and need not be described further. The timing circuitry ensures that the operational period of motor 14 overlaps the dispensing of cold and hot water into the mixing chamber, preferably both at its commencement and end.

In operation, storage hopper 12 is filled with a supply of particulate or powdered instant coffee, such as spray dried or freeze dried coffee. To dispense a serving of coffee beverage, the operator depresses switch 16 to close its normally opened contact. That action instantaneously energizes the timer 15, and closes switch 1 of the timer, which preferably remains closed during the entire dispensing cycle. Closure of switch 1 activates motor 14 to rotate shafts 17 and 19, thereby effecting rapid rotation of the agitator 18 in the mixing chamber and rotation of metering unit 23 to discharge a measured amount (e.g. 2 gm) of instant coffee powder from hopper 12 into duct 26. Switch 2 of the timer is closed to energize solenoid valve 30 in cold water line 29 for a short period of time to permit a small predetermined amount (e.g. 20 ml) of cold water (e.g. 10° C.-24° C.) to be discharged into duct 26 at which time switch 2 is opened to deactivate solenoid valve 30. The powdered instant coffee is dissolved in the cold water in the duct 26 to form a cold liquid coffee concentrate which is carried into the mixing chamber. The cold liquid coffee concentrate entering the mixing chamber is displaced against the sidewalls of the chamber and air is entranned in the liquid by the rapid rotation of agitator 18 to foam the concentrate, with the foamed concentrate being suspended in the mixing chamber by the rotation of the agitator.

As the cold concentrate is being foamed, switch 3 of the timer is closed to activate heating unit 34 whereby cold water in line 33 is heated to a desired temperature (e.g. 80°-90° C.). Upon reaching this temperature, switch 3 is opened to deactivate the heating unit and switch 4 is closed, to energize solenoid valve 37 for a period of time to permit a predetermined amount of hot water (e.g. 130 ml) to be discharged from line 36 into duct 26 and chamber 11 with the hot water preferably being introduced tangentially along the sidewalls of the mixing chamber to break the surface tension of the foam on the sidewalls. The amount of hot water introduced into chamber 11 comprises the balance of the water needed to produce a cup of reconstituted instant coffee of the desired strength. While the total amount of water (i.e. the cold water fraction plus the hot water fraction) introduced into the mixing chamber will vary depending on the amount of powdered instant coffee used and the desired strength of the reconstituted coffee, it is generally preferred that the volume ratio of hot water to cold water introduced into the mixing chamber be between about 2:1 to 7:1. The addition of the hot water to the mixing chamber dilutes the foamed coffee concentrate to provide a liquid reconstituted coffee fraction of the desired concentration while substantially retaining the foamed structure to provide a foamed coffee fraction comprising air bubbles dispersed throughout a continuous phase of hot liquid coffee of the desired concentration.

At this point, switch 1 of the timer and switch 16 are opened, and rotation of the agitator is stopped, whereby the reconstituted beverage flows to the bottom of the chamber from which it is discharged through opening 38 and spout 39 into a cup positioned below the dispenser. Thus, the reconstituted beverage discharged from the mixing chamber includes a liquid coffee fraction comprising reconstituted liquid coffee of the desired concentration and a foamed coffee fraction which rests on the surface of the liquid fraction, thereby providing a coffee beverage having a thick layer of stable foam on the surface of the liquid coffee, similar in appearance to a cappuccino coffee beverage. Typically the coffee foam fraction comprises about 20%–35% by volume of the reconstituted beverage dispensed into the cup. Since the sidewalls of the mixing chamber are cooled by cooling coil 32, the temperature of the mixing chamber is maintained within desired limits, even after the addition of the hot water, so that no waiting period is required between operating cycles of the dispenser. Other suitable means for dissipating heat from the sidewalls of the mixing chamber may, of course, be used.

If desired, the control circuitry of timer 15 may be such that switch 1 is opened prior to the closure of switch 4. That is, switch 1 is opened to deactivate motor 14 and agitator 18 after the liquid concentrate has been foamed but prior to the introduction of hot water into the mixing chamber.

What is claimed is:

1. An apparatus for producing and dispensing a reconstituted coffee beverage having a foamed surface which comprises
   a mixing chamber having sidewalls and a bottom wall,
   agitator means mounted for rotation in the mixing chamber, cooling means for dissipating heat from the sidewalls of the mixing chamber,
   means for introducing a predetermined amount of cold liquid coffee concentrate into the mixing chamber,
   motor means for driving the agitator means at a speed such that the liquid coffee concentrate in the mixing chamber is displaced against the sidewalls of the mixing chamber and air is entrained in the liquid concentrate to foam the concentrate,
   valve means associated with said chamber for introducing a predetermined amount of hot water into the mixing chamber, and
   timing means for controlling the sequence of activation of said motor means, the means for introducing liquid coffee concentrate and said valve means,
   the bottom wall of said mixing chamber having a discharge opening therethrough for discharging reconstituted coffee beverage from the mixing chamber.

2. The apparatus defined in claim 1 in which the cooling means comprises a cooling coil surrounding the sidewalls of the mixing chamber.

3. The apparatus defined in claim 1 which includes duct means for carrying hot water from said valve means into the upper portion of the mixing chamber tangentially along the sidewalls of the chamber.

4. An apparatus for producing and dispensing a reconstituted coffee beverage having a foamed surface which comprises
   a mixing chamber having sidewalls and a bottom wall,
   agitator means mounted for rotation in the mixing chamber, cooling means for dissipating heat from the sidewalls of the mixing chamber,
   metering means associated with the mixing chamber for dispensing a controlled amount of particulate dehydrated coffee into said chamber,
   first and second valve means associated with said chamber operable upon activation to sequentially introduce predetermined amounts of cold water and hot water into the mixing chamber,
   motor means for operating the agitator means and the metering means,
   discharge means associated with the bottom wall of the mixing chamber for removing reconstituted coffee beverage comprising a liquid coffee fraction and a foamed coffee fraction from the mixing chamber, and
   timing means for sequentially activating the motor means and the first and second valve means.

5. The apparatus defined in claim 4 in which the cooling means comprises a cooling coil surrounding the sidewalls of the mixing chamber.

6. The apparatus defined in claim 5 which includes a supply hopper for holding particulate dehydrated coffee in which the metering means is mounted, and a discharge duct for receiving particulate dehydrated coffee from the supply hopper and cold water from said first valve means for introduction into the mixing chamber.

7. The apparatus defined in claim 6 in which gear means are associated with said motor means and said metering means for actuating the metering means upon actuation of the motors means.

8. The apparatus defined in claim 5 which includes a first conduit means for supplying cold water to said first valve means and said cooling coil.

9. The apparatus defined in claim 8 which includes heating means, with said first conduit means carrying cold water from said cooling coil to the heating means, and second conduit means for carrying hot water from the heating means to said second valve means, with said heating means being operatively connected to said timing means for sequential activation.

10. The apparatus defined in claim 9 in which said second conduit means carriers hot water from the heating means through said second valve means into the mixing chamber and is arranged to introduce hot water tangentially along the sidewalls of the mixing chamber.

* * * * *